(12) United States Patent
Dezuno et al.

(10) Patent No.: US 9,011,759 B2
(45) Date of Patent: Apr. 21, 2015

(54) MOBILE WORKBENCH

(75) Inventors: Kiyoshi Dezuno, Tokyo (JP); Tetsuo Koike, Tokyo (JP)

(73) Assignee: Koike Sanso Kogyo Co., Ltd., Edogawa-ku, Tokyo (JP)

( * ) Notice: Subject to any disclaimer, the term of this patent is extended or adjusted under 35 U.S.C. 154(b) by 188 days.

(21) Appl. No.: 13/577,433

(22) PCT Filed: Feb. 4, 2011

(86) PCT No.: PCT/JP2011/052362
§ 371 (c)(1),
(2), (4) Date: Aug. 6, 2012

(87) PCT Pub. No.: WO2011/096514
PCT Pub. Date: Aug. 11, 2011

(65) Prior Publication Data
US 2012/0305326 A1  Dec. 6, 2012

(30) Foreign Application Priority Data

Feb. 4, 2010 (JP) .................................. 2010-023338

(51) Int. Cl.
*B60K 28/10* (2006.01)
*B23K 37/02* (2006.01)

(52) U.S. Cl.
CPC ......... *B23K 37/0282* (2013.01); *B23K 37/0247* (2013.01); *B23K 37/0252* (2013.01); *B23K 37/0258* (2013.01); *B23K 37/0288* (2013.01)

(58) Field of Classification Search
CPC ... B23K 7/102; B23K 37/0247; B23Q 9/0007
USPC .............................................. 266/48, 67–69
See application file for complete search history.

(56) References Cited

U.S. PATENT DOCUMENTS 4,659,904 A * 4/1987 Greineder ................ 219/130.21

FOREIGN PATENT DOCUMENTS

| JP | 55-95110 A | 7/1980 |
|----|------------|--------|
| JP | 7-284939 A | 10/1995 |
| JP | 9-94669 A | 4/1997 |
| JP | 10-15663 A | 1/1998 |
| JP | 3400290 B2 | 4/2003 |
| JP | 2007-135008 A | 5/2007 |

OTHER PUBLICATIONS

International Search Report directed to PCT/JP2011/052362, 4 pages including English translation.

* cited by examiner

*Primary Examiner* — Scott Kastler
(74) *Attorney, Agent, or Firm* — Shlesinger, Arkwright & Garvey LLP

(57) ABSTRACT

Provided is a mobile workbench constructed so as to determine that an accident of some kind has occurred and to stop if the speed of the mobile workbench suddenly changes. A mobile workbench (A) travels on a material (Ca) to be processed and performs predetermined processing (welding) by using a processing tool (welding torch (B)) mounted thereon. The mobile workbench (A) comprises: a workbench main body (1); a plurality of wheels (4) which are provided on the workbench main body (1); a drive motor (3a) which drives the wheels (4); an acceleration sensor (10) which detects the acceleration acting on the workbench; and a control unit (12) which is constructed so as to determine that an abnormality has occurred and to stop the drive motor (3a) if a sudden change in speed is detected by the acceleration sensor (10).

3 Claims, 4 Drawing Sheets

MOBILE WORKBENCH

TECHNICAL FIELD

The present invention relates to a mobile workbench which is used to weld or cut a subject processing material, and more particularly, to a mobile workbench which is configured to stop in the event of an abnormality that is determined when an abrupt change in speed is detected.

BACKGROUND ART

A mobile workbench which travels on a subject cutting material such as a steel sheet or a stainless steel sheet and cuts the subject cutting material by operating a gas cutting torch or a plasma cutting torch installed therein has been used. Alternatively, a mobile workbench which travels on one side of a subject welding material such as a pair of steel sheets or stainless steel sheets and welds the subject welding material by operating the welding torch installed therein has been used.

In the case of the above-described mobile workbench, plural wheels are arranged, and a cutting torch or a welding torch is generally disposed between the wheels disposed at the front and rear sides in the traveling direction, so that a desired process may be performed within a limited area. That is, the position where the wheel of the mobile workbench approaches a position closest to the end of the subject processing material becomes the limit.

The mobile workbench may be operated in a manner such that a worker operates switches provided in the mobile workbench. Alternatively, a teaching operation may be performed in a manner such that a worker grips a hand holding type remote operation panel constructed through a cord like a teaching and playback type mobile workbench and operates switches provided in the remote operation panel.

In particular, in the case of the mobile workbench which travels on the upper surface of the subject processing material and performs cutting or welding thereon, one worker may perform a desired process while being in charge of several mobile workbenches. In such a case, generally, the worker operates one mobile workbench so that the mobile workbench automatically travels afterward, and prepares the other mobile workbenches to operate while the first mobile workbench is automatically traveling so as to perform a process thereof.

For example, Patent Literature 1 discloses a traveling workbench (a mobile workbench) in which a guide roller travels while coming into press-contact with a surface of a steel sheet disposed perpendicularly by directing the traveling direction toward the steel sheet disposed to be slightly perpendicular to the welding proceeding direction so that the surfaces of the steel sheets disposed to be perpendicular to each other are used as a guide when the intersection portion between two steel sheets (the subject processing materials) disposed to be perpendicular to each other are fillet-welded. In the case of using the traveling workbench, welding may be satisfactorily performed by using upright plates as a guide.

However, even in the traveling workbench with the above-described configuration, it is a problem to stop the traveling workbench when it reaches the end of the steel sheet. In order to solve this problem, a traveling workbench is proposed which is stopped in accordance with a detection signal generated when the end of the steel sheet is detected by a sensor installed in the traveling workbench or a dock provided near the end of the steel sheet is detected by the sensor.

CITATION LIST

Patent Literature

Patent Literature 1: Japanese Patent No. 3400290

DISCLOSURE OF INVENTION

Problem to be Solved by the Invention

In the case of the mobile workbench which travels on the upper surface of the subject processing material and performs cutting or welding thereon, there is concern that the workbench may collide with an unexpected barrier present in the traveling range for performing a desired process or the wheel may fall from the end of the subject processing material regardless of the installation of the sensor or the dock. Further, when the hand holding type remote operation panel constructed through the cord is gripped and operated by the worker like the teaching and playback type mobile workbench, there is concern that the remote operation panel may fall due to a certain reason during the operation.

Likewise, when an accident is generated in the mobile workbench due to an unexpected barrier, the mobile workbench needs to be immediately stopped. However, a structure for monitoring a factor which may cause an unexpected accident at all times is not desirable in that a considerable increase in cost is caused. For this reason, there is a demand for the development of the mobile workbench capable of immediately stopping the operation thereof when a certain accident is generated in the mobile workbench.

It is an object of the invention to provide a mobile workbench configured to stop in the event of an accident caused by a certain reason when the speed of the mobile workbench abruptly changes.

Means for Solving the Problem

In order to solve the above-described problem, there is provided a mobile workbench of the invention configured to travel on a subject processing material and to perform a predetermined process on the subject processing material by a processing tool installed therein, the mobile workbench including: a workbench main body; plural wheels which are installed in the workbench main body; a driving motor which is provided in the workbench main body and drives the wheels; an acceleration sensor which is provided in the workbench main body and detects an acceleration exerted on the workbench; and a control unit which controls the driving of the driving motor and stops the driving motor in the event of an abnormality determined when the acceleration sensor detects an abrupt change in speed.

In the mobile workbench, the mobile workbench may include a remote operation panel which is equipped with an acceleration sensor, and the control unit may stop the operation of the driving motor and the processing tool in the event of an abnormality in the remote operation panel determined when the acceleration sensor detects an abrupt change in speed of the remote operation panel.

Effect of the Invention

In the mobile workbench according to the invention, when a change in speed of the mobile workbench is detected by the acceleration sensor provided in the workbench main body and the detected change in speed is abrupt, this case is determined as an abnormality and the driving motor is stopped so as to stop the mobile workbench. For this reason, in the case where the wheel falls from the end of the subject processing material or the workbench collides with an unexpected barrier, it is possible to immediately stop the mobile workbench and narrow the range of the cutting defect or the welding defect.

Further, in the case where the mobile workbench includes the remote operation panel, when the remote operation panel is equipped with the acceleration sensor, it is possible to stop the mobile workbench and stop the operation of the processing tool by detecting an abrupt change in speed with the falling of the remote operation panel. For this reason, when the remote operation panel which is gripped by the worker is missed and dropped by an unexpected accident, it is possible to immediately stop the mobile workbench and stop the operation of the processing tool at the same time. Accordingly, for example, when a teaching work is performed on the mobile workbench or the processing tool, it is possible to reduce an unnecessary operation by immediately stopping the operation of the mobile workbench and the processing tool.

DESCRIPTION OF THE EMBODIMENT

Figure 1:
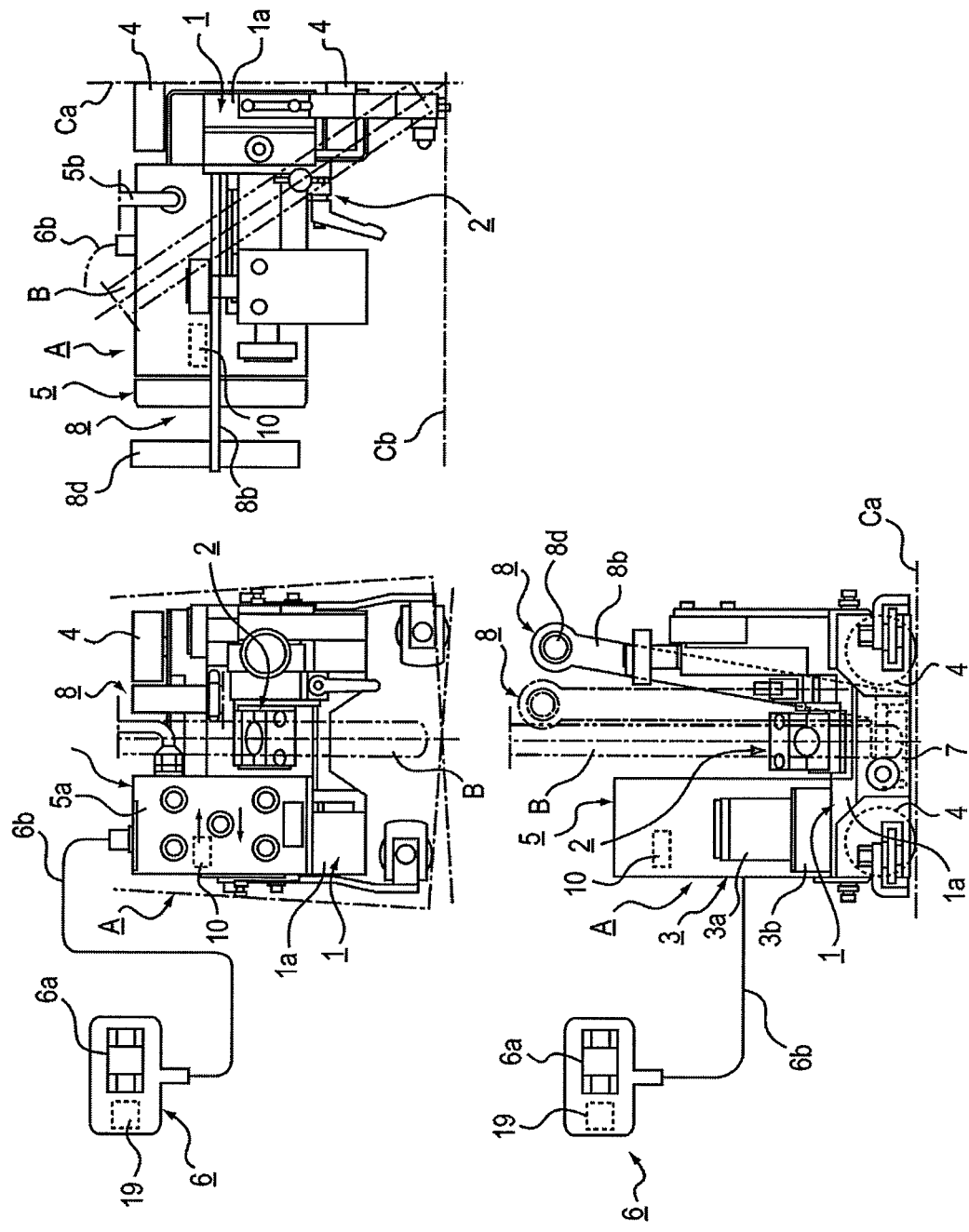
FIG. 1 is three orthogonal views illustrating the configuration of a welding machine that adopts a mobile workbench.

Hereinafter, an embodiment of a mobile workbench according to the invention will be described by referring to the drawings. The mobile workbench according to the invention is configured to travel on a subject processing material such as a subject cutting material or a subject welding material formed of a steel sheet, a stainless steel sheet, or the like and perform a predetermined process on the subject processing material by a processing tool such as a welding torch, a plasma cutting torch, or a gas cutting torch which is mounted thereon.

In particular, the mobile workbench according to the invention is configured to stop a driving motor in the event of an abnormality during a work that is determined when an abrupt change in speed exerted on the mobile workbench is detected during the work. For this reason, for example, when the mobile workbench falls from the end of the subject processing material or collides with an unexpected barrier present on the subject processing material, the mobile workbench may be immediately stopped.

Further, in the case where the mobile workbench is equipped with a remote operation panel, the operation of a driving motor and a processing tool is stopped by detecting an abrupt change in speed of the remote operation panel. For this reason, even when a worker who grips the remote operation panel drops the remote operation panel, the mobile workbench may be immediately stopped and the operation of the processing tool may be stopped.

In the invention, the magnitude of an abrupt change in speed occurring in the mobile workbench is not limited. That is, a change in speed of the mobile workbench and a change in speed occurring in the remote operation panel may not be equal to each other, but may be different from each other. Further, a change in speed occurring in the mobile workbench should not correspond to that of a desired process, and a change in speed of the desired process needs to be a value which is obviously different from the change in speed at this time. For this reason, the abnormal change in speed needs to be appropriately set in consideration of the respective conditions in accordance with the desired process.

However, in the embodiment below, a set value is set to 0.5 G and the set value is compared with a measurement value of a change in speed measured based on the set value. When the measurement value is smaller than 0.5 G, it is determined that the mobile workbench or the remote operation panel is in a normal state. When the measurement value is larger than 0.5 G, it is determined that the mobile workbench or the remote operation panel is in an abnormal state.

Hereinafter, the configuration of the welding machine which adopts the mobile workbench according to the invention will be described. The mobile workbench A shown in the drawing is configured as a mobile workbench which constitutes a welding machine that is equipped with a welding torch B corresponding to a processing tool depicted by a two-dotted chain line in FIG. 1 and fillet-welds subject processing materials Ca and Cb depicted by an one-dotted chain line. However, the mobile workbench according to the invention may be used as a mobile workbench which constitutes a cutting machine by equipping with a gas cutting torch or a plasma cutting torch instead of the welding torch B. Hereinafter, in the embodiment, the mobile workbench A will be described as a mobile workbench dedicated for welding.

In the drawing, a workbench main body 1 of the mobile workbench A includes a main body casing 1a and a bottom plate 1b which occupies the bottom surface of the main body casing 1a, and the upper portion of the main body casing 1a is provided with a holding member 2 which holds the welding torch B. Then, the torch B may be installed therein by attaching and fixing the welding torch B to the holding member 2. In particular, the upper surface corresponding to the arrangement position of the welding torch B in the main body casing 1a is provided with a recess portion which is inclined from one side surface to the upper surface. Since the recess portion is formed, the inclination angle of the welding torch B may be made to be large.

The upper portion of the main body casing 1a which constitutes the body 1 is provided with a driving device 3 which includes a driving motor 3a configured as an adjustable-speed motor and a speed reducer 3b. Further, two shafts are arranged in the front-rear direction inside the main body casing 1a, where one shaft is connected to the driving device 3 and the shafts are connected to each other through a power transmission member such as a not shown timing belt or a chain. Further, a wheel 4 which is formed of rubber is fixed to both ends of each shaft.

Furthermore, the driving device 3 does not need to include the driving motor 3a which is configured as the adjustable-speed motor, and may be configured by the combination of a normal rotation motor and a speed changer. Further, it is needless to mention that the driving motor is configured as a speed reduction motor and the driving device 3 is configured by the combination of the speed reduction motor and the speed changer.

An operation panel 5 is provided near the driving device 3 in the upper portion of the main body casing 1a. The operation panel 5 accommodates a control board 11 which will be described later, and the surface thereof is provided with operation equipment 5a which includes a switch that indicates the traveling direction, a dial that sets the traveling speed, a display lamp that displays an operation state, or the like. Further, a connector to which a power cord 5b is connected is connected to a predetermined position of the operation panel 5. Furthermore, the operation panel 5 is connected with a communication line 17 which is connected to a welding power supply unit 15 shown in FIG. 3, a not shown plasma power supply, or a gas supply device so as to transmit various control signals thereto.

Further, the operation panel 5 is connected with a remote operation panel 6, which is gripped by the worker to be operated, through the cord 6b. The remote operation panel 6 may be configured as an operation panel which may operate the traveling operation of the workbench main body 1. When the mobile workbench A is configured as a welding robot, an operation panel may be employed which teaches and plays back the operation of the mobile workbench A.

The remote operation panel 6 is equipped with operation equipment 6a which corresponds to the function of the remote operation panel 6. That is, in the case where the remote operation panel 6 only operates the traveling operation of the traveling workbench 1, as the operation equipment 6a, the operation equipment 6a configured as a switch or a dial which is the same as that of the operation equipment 5a of the operation panel 5 installed in the main body casing 1a is disposed.

Further, in the case where the mobile workbench A is configured as the robot, as the operation equipment 6a, equipment for controlling the traveling speed or the traveling direction of the workbench main body 1, equipment including a switch, a dial, or a touch panel for controlling the operation of the welding power supply, equipment for teaching the operation state of the welding power supply synchronized with the traveling operation of the workbench main body 1, or the like is disposed.

In the above-described configuration, when the driving motor 3a is driven, the rotation of the driving motor 3a is transmitted to one shaft through the speed reducer 3b, and is transmitted to the other shaft through the power transmission member. Then, four wheels 4 rotate, so that the main body 1 travels. At this time, since the wheels 4 are respectively formed of rubber, the contact friction with respect to the subject processing material Cb is large, whereby a large traction force may be exhibited.

A magnet 7 is disposed at the approximate center inside the body 1. In the embodiment, as the magnet 7, a permanent magnet formed of ferrite magnet steel is used. However, the invention is not limited to the magnet, and any type may be used as long as it is a permanent magnet. Further, the bottom plate 1b which is attached to the main body casing 1a constituting the body 1 is formed of a non-magnetic material such as aluminum or stainless steel.

The magnet 7 is attached to an attachment piece 8a of a lever 8. The lever 8 is formed in a substantial L-shape that includes the attachment piece 8a and an upright piece 8b which is upright from the attachment piece 8a. Then, the magnet 7 is attached to a bracket 8c which is attached to the side surface of the attachment piece 8a. The attachment structure of the magnet 7 with respect to the attachment piece 8a is not particularly limited, and an attachment structure using a bolt, a screw, or the like may be employed.

A shaft 9 is disposed at a predetermined position of the main body casing 1a of the body 1, and one end (L-shaped front end) of the attachment piece 8a of the lever 8 is attached to the shaft 9. Accordingly, the lever 8 is configured to be rotatable about the shaft 9 which is attached to the front end of the attachment piece 8a, and is configured so that the posture of the magnet 7 changes with the rotation of the lever 8. In particular, the magnet 7 exhibits the strongest adsorptivity when it is substantially horizontal with respect to the subject processing material Ca, and the adsorptivity becomes smaller as the inclination angle becomes larger. For example, when the magnet 7 is inclined by approximately 6° to 8° with respect to the subject processing material Ca while the mobile workbench A is placed on the subject processing material Ca, the magnet may be torn off from the subject processing material Ca. When the magnet is inclined by an angle larger than 8°, the magnet may be more easily torn off.

Furthermore, a handle 8d is provided at the upper end portion of the upright piece 8b.

In order to utilize the adsorptivity of the magnet 7 with respect to the subject processing material Ca, it is desirable that the magnet 7 be disposed at a position adjacent to the bottom plate provided at the bottom portion of the main body casing 1a as much as possible. For this reason, the position of the shaft 9 provided in the main body casing 1a is disposed at a height in which the corner portion of the magnet 7 does not come into contact with the bottom plate when the lever 8 is rotated so as to incline the magnet 7 by approximately 8° to 10° and a position substantially matching the center of the mobile workbench A.

Figure 2:
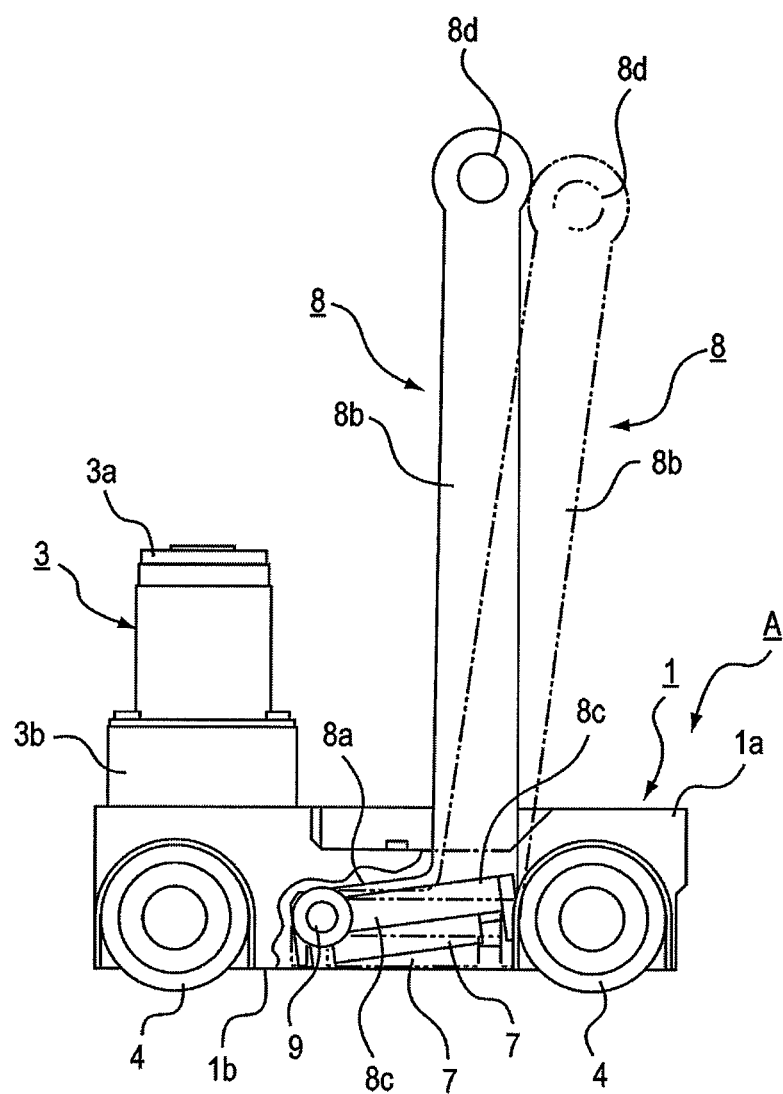
FIG. 2 is a diagram illustrating a relation between a magnet and a rotation of a lever that constitutes the mobile workbench.

Further, when the lever 8 is disposed at the position depicted by the two-dotted chain line of FIG. 2, the magnet 7 approaches the subject processing material Ca with a substantially parallel posture. In this state, the air gap between the magnet 7 and the subject processing material Ca becomes a minimal value, and a traction force corresponding to the substantially maximal adsorptivity is exhibited. Further, when the lever 8 rotates up to the position depicted by the solid line in the same drawing, the magnet 7 is inclined by approximately 8° with respect to the subject processing material Ca, so that the air gap becomes the maximal value. As a result, since the adsorptivity becomes smaller, the magnet may be easily separated from the subject processing material Ca.

The workbench main body 1 is equipped with an acceleration sensor 10. The invention does not limit the position where the acceleration sensor 10 is provided in the workbench main body 1, and the position may be set so that a change in speed occurring in the mobile workbench A may be reliably detected. Further, since it is not desirable that a direct external force be exerted on the acceleration sensor 10, it is desirable to install the acceleration sensor at a position where such an external force is not exerted. For this reason, in the embodiment, the acceleration sensor 10 is attached to the control board 11 accommodated in the operation panel 5 which is provided near the driving device 3 in the upper portion of the main body casing 1a.

The acceleration sensor 10 is configured to measure an acceleration corresponding to a three-dimensional change in speed and generate a signal corresponding to the measured acceleration. Then, the acceleration sensor is configured to measure a change in speed of the workbench main body 1 at all times while traveling with respect to the subject processing material Ca and transmit the measured value to a control unit to be described later. In the embodiment, the acceleration sensor 10 capable of measuring a change in speed in the range of ±0.1 G to ±3.0 G is used.

Figure 3:
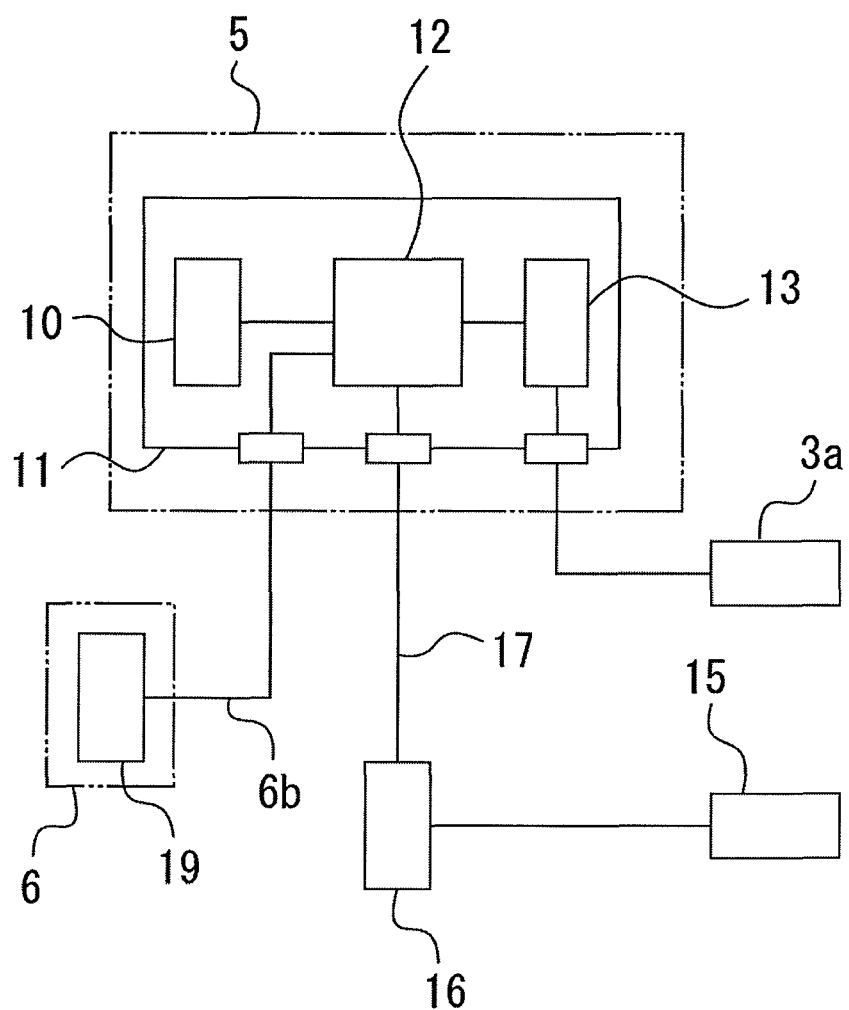
FIG. 3 is a block diagram illustrating a control system of the mobile workbench.

Next, the control system of the mobile workbench A will be described by referring to the block diagram of FIG. 3. The control board 11 shown in the drawing is accommodated in the operation panel 5 which is provided in the upper portion of the main body casing 1a of the workbench main body 1 which constitutes the mobile workbench A. The control board 11 is equipped with the acceleration sensor 10, the control unit 12 configured as a computer, the driving circuit 13 of the driving motor 3a, and not shown equipments which are necessary to control the mobile workbench A.

Further, the work board 11 and the welding power supply unit 15 distant from the mobile workbench A are connected to each other through an I/O unit 16 and the communication line 17, and the welding power supply unit 15 may be operated and stopped in accordance with the command signal issued by the control unit 12.

Furthermore, in the case where the mobile workbench A is equipped with the plasma cutting torch, a plasma power supply unit is connected to the control board instead of the welding power supply unit 15. In the case where the mobile workbench is equipped with the gas cutting torch, the gas supply device is connected to the control board.

Further, in the case where the mobile workbench A includes the remote operation panel 6, an acceleration sensor 19 which is the same as the acceleration sensor 10 is attached to the inside of the remote operation panel 6. The acceleration sensor 19 is connected to the control unit 12 through the cord 6b. The control unit 12 is configured to recognize an abnormal state when any one of the acceleration sensors 10 and 19 detects an abrupt change in speed.

Next, a sequence of stopping the driving motor 3a when detecting an abrupt change in speed while a desired process is performed in the mobile workbench A with the above-described configuration will be described by referring to FIG. 4.

In the control unit 12, the detection value when stopping the driving motor 3a is set to 0.5 G, and the optimal speed when performing the desired welding is set and stored in advance. At this time, all settings necessary for performing the desired welding, such as a setting of a voltage value or a current value of the welding power supply unit 15 or a setting of a gas flow rate are performed.

After the setting necessary for performing the desired welding is performed, the welding torch B is directed to the intersecting portion between the subject processing materials Ca and Cb. Then, the fillet-welding using the welding torch B is started and the traveling of the mobile workbench A is started.

Figure 4:
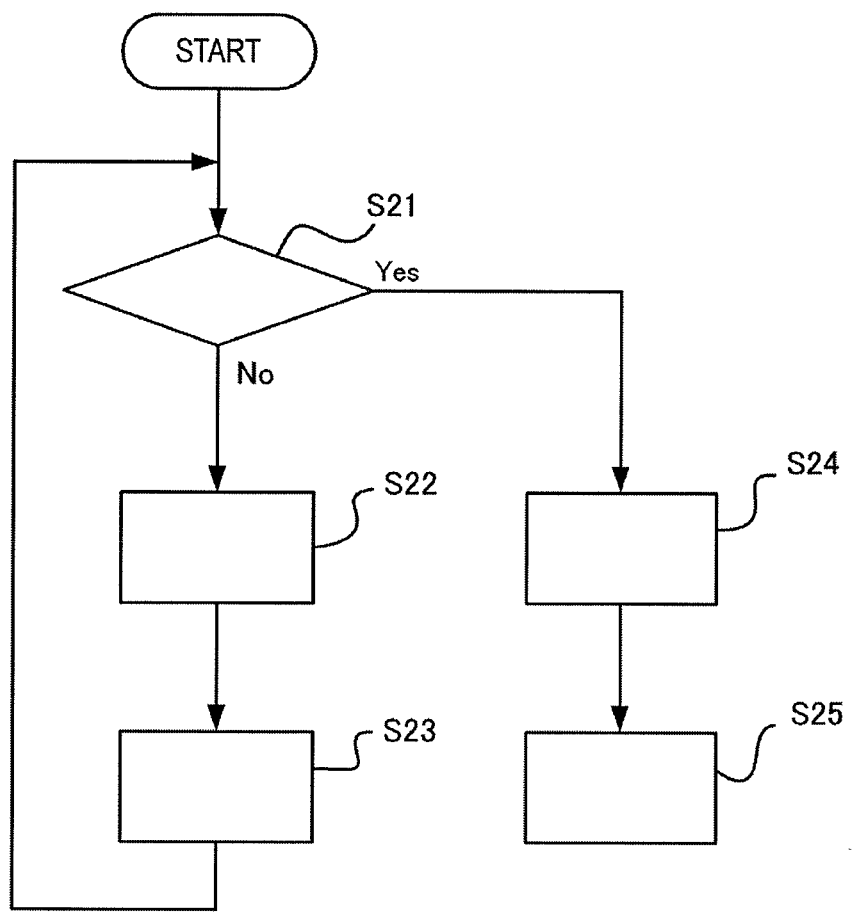
FIG. 4 is a flowchart at the time of detecting an abrupt change in speed caused when a mobile workbench or a remote operation panel falls.

As shown in FIG. 4, the acceleration detection values which are continuously detected by the acceleration sensors 10 and 19 are transmitted to the control unit 12 while the mobile workbench A travels. Then, in step S21, the acceleration detection value transmitted to the control unit 12 is compared with the previously set value. When the detection value does not exceed the set value, the current step proceeds to step S22 so as to maintain the traveling state of the mobile workbench A. Then, in step S23, the operation state of the welding power supply unit 15 is maintained. Accordingly, the welding process with respect to the subject processing materials Ca and Cb is continuously performed.

Further, when the acceleration detection value exceeds the set value, the current step proceeds to step S24 so as to stop the driving motor 3a so that the traveling of the mobile workbench A is stopped. Then, in step S25, the operation of the welding power supply unit 15 is stopped. Accordingly, the welding process with respect to the subject processing materials Ca and Cb is immediately stopped, and the mobile workbench A is maintained at the position where the welding is stopped. For this reason, it is easy to determine what the worker performs in the next, for example, whether the welding is resumed or the workbench moves to the next work portion.

Such acceleration in which the detection value exceeds the set value may occur, for example, when the mobile workbench A continuously travels so that the wheel falls from the end of the subject processing material Ca and hence the bottom plate 1b of the mobile workbench A collides with the end of the subject processing material Ca. In this case, the impact when the bottom plate 1b of the mobile workbench A collides with the end of the subject processing material Ca is detected as an acceleration which is larger than 0.5 G by the acceleration sensor 10.

Further, such acceleration may occur when the remote operation panel 6 gripped and operated by the worker falls due to a certain reason and the remote operation panel collides with the subject processing material Ca. In this case, although the acceleration sensor 10 provided in the mobile workbench A detects an acceleration which is smaller than 0.5 G, the impact when the remote operation panel 6 collides with the subject processing material Ca is detected as an acceleration which is larger than 0.5 G by the acceleration sensor 19.

Further, even when an unexpected barrier (for example, a tool such as a hammer or a spanner, a cord, or the like) is present in the traveling range of the mobile workbench A on the subject processing material Ca and the mobile workbench A collides with the barrier, the impact at this time is detected as an acceleration which is larger than 0.5 G by the acceleration sensor 10.

As described above, an accident rarely happens in which the wheel of the mobile workbench A falls from the end of the subject processing material Ca or the worker drops the remote operation panel 6. However, since the acceleration sensors 10 and 19 are provided, the mobile workbench A may be stopped by reliably detecting such an accident, and the operation of the processing tool including the welding torch B may be stopped as soon as the mobile workbench A is stopped. For this reason, even when a trouble occurs in the desired process, the troubled area may be contained in a narrow range.

In particular, if the mobile workbench A accelerates or decelerates when the mobile workbench A collides with an unexpected barrier, a change in acceleration caused by the collision and a change in speed caused by the speed change cancel each other, so that the collision with the barrier may not be reliably detected. Further, the collision with the barrier may not be reliably detected even by the size or the weight of the barrier or the property (for example, the presence of elasticity or the like).

In this case, the control unit 12 compares the acceleration (the acceleration in the acceleration direction and the acceleration in the deceleration direction) applied in the advancing direction while the mobile workbench A travels with the acceleration generated when the mobile workbench A drives the wheel 4 using the driving motor 3a. When a difference therebetween exceeds the set value, it is determined that the mobile workbench A collides with the barrier. Then, based on this determination, the driving motor 3a is stopped and the operation of the welding power supply unit 15 is stopped.

Furthermore, the set value when detecting the collision of the mobile workbench A while the mobile workbench A accelerates or decelerates is not limited to 0.5 G described above, and may be, for example, approximately 0.1 G which is smaller than the above-described value. That is, the set value when the mobile workbench A travels at a normal speed may be different from the set value when the speed change is performed.

INDUSTRIAL APPLICABILITY

The mobile workbench A according to the invention may be used as a workbench that constitutes a cutting machine or a welding machine for welding a steel sheet or a stainless steel sheet.

DESCRIPTION OF REFERENCE SIGNS

A MOBILE WORKBENCH
B WELDING TORCH
Ca, Cb SUBJECT PROCESSING MATERIAL
1 WORKBENCH MAIN BODY
1a MAIN BODY CASING
1b BOTTOM PLATE
2 HOLDING MEMBER
3 DRIVING DEVICE
3a DRIVING MOTOR
3b SPEED REDUCER
4 WHEEL
5 OPERATION PANEL
5a OPERATION EQUIPMENT
5b POWER CORD
6 REMOTE OPERATION PANEL
6a OPERATION EQUIPMENT
6b CORD
7 MAGNET
8 LEVER
8a ATTACHMENT PIECE
8b UPRIGHT PIECE
8c BRACKET
8d HANDLE
9 SHAFT
10 ACCELERATION SENSOR
11 CONTROL BOARD
12 CONTROL UNIT
13 DRIVING CIRCUIT
15 WELDING POWER SUPPLY UNIT
16 I/O UNIT
17 COMMUNICATION LINE
19 ACCELERATION SENSOR

The invention claimed is:

1. A mobile workbench which travels on a subject processing material and performs a predetermined process on the subject processing material by a processing tool installed therein, the mobile workbench comprising:
    a workbench main body;
    a plurality of wheels which are installed in the workbench main body;
    a driving motor which is provided in the workbench main body and drives the wheels;
    an acceleration sensor which is provided in the workbench main body and detects an acceleration exerted on the mobile workbench; and
    a control unit which controls the driving of the driving motor and detects with the acceleration sensor an acceleration applied in an advancing direction of the mobile workbench and an acceleration generated when the mobile workbench drives the wheels using the driving motor and compares these detected accelerations and stops the driving motor when a difference between these detected accelerations exceeds a predetermined value.

2. The mobile workbench according to claim 1, wherein the mobile workbench includes a remote operation panel which is equipped with a further acceleration sensor, and the control unit stops the operation of the driving motor and the processing tool in the event of an abnormality in the remote operation panel determined when the further acceleration sensor detects an abrupt change in speed of the remote operation panel.

3. The mobile workbench according to claim 1, wherein the control unit stops an operation of the predetermined process by the processing tool when the difference between the accelerations exceeds a predetermined value.

* * * * *